US011270508B2

(12) United States Patent
Singh (10) Patent No.: US 11,270,508 B2
(45) Date of Patent: Mar. 8, 2022

(54) SPATIAL REPRESENTATION IN VIRTUAL AND MIXED REALITY

(71) Applicant: SUPERBOLT TECHNOLOGIES PVT. LTD., Bengaluru (IN)

(72) Inventor: B. S Arvind Prakash Singh, Bengaluru (IN)

(73) Assignee: SUPERBOLT TECHNOLOGIES PVT. LTD., Bengaluru (IN)

(*) Notice: Subject to any disclaimer, the term of this patent is extended or adjusted under 35 U.S.C. 154(b) by 0 days.

(21) Appl. No.: 16/954,485

(22) PCT Filed: Dec. 14, 2018

(86) PCT No.: PCT/IN2018/050839
§ 371 (c)(1),
(2) Date: Jun. 16, 2020

(87) PCT Pub. No.: WO2019/116394
PCT Pub. Date: Jun. 20, 2019

(65) Prior Publication Data
US 2021/0082190 A1    Mar. 18, 2021

(30) Foreign Application Priority Data

Dec. 16, 2017    (IN) .............................. 201741021108

(51) Int. Cl.
*G06T 19/00*    (2011.01)
*G06Q 10/10*    (2012.01)
(Continued)

(52) U.S. Cl.
CPC ............. *G06T 19/00* (2013.01); *G06Q 10/10* (2013.01); *G06Q 20/42* (2013.01);
(Continued)

(58) Field of Classification Search
CPC . G06T 19/00; G06T 2200/24; G06T 2210/04; G06Q 10/10; G06Q 20/42;
(Continued)

(56) References Cited

U.S. PATENT DOCUMENTS 7,680,694 B2    3/2010  Glazer et al.
2010/0228628 A1*  9/2010  Dufour .............. G06Q 30/0255
                                                              705/14.53
(Continued)

FOREIGN PATENT DOCUMENTS

CN    101482959 A    1/2009

*Primary Examiner* — David T Welch
(74) *Attorney, Agent, or Firm* — Maschoff Brennan (57) ABSTRACT

A system generating virtual reality spatial representation of functional spaces and a method for using the same is disclosed. The system comprises of a remote server executing a plurality of instructions to generate a three dimensional spatial representation of functional spaces upon receiving an input such as a floor plan from the user of the system. The spatial representation thus created is rendered in virtual or mixed reality and allows the user to interact with the representation. In addition, the system of the present disclosure allows the user to collaborate with one or more other users to add a plurality of virtual objects into the spatial representation and use the annotated representation for designing functional spaces. Other methods are also described herein.

10 Claims, 4 Drawing Sheets

(51) Int. Cl.
*G06Q 20/42* (2012.01)
*G06Q 30/06* (2012.01)
*G06Q 50/16* (2012.01)
*G06F 3/0486* (2013.01)

(52) U.S. Cl.
CPC ..... *G06Q 30/0631* (2013.01); *G06Q 30/0633* (2013.01); *G06Q 30/0643* (2013.01); *G06Q 50/163* (2013.01); *G06F 3/0486* (2013.01); *G06T 2200/24* (2013.01); *G06T 2210/04* (2013.01)

(58) Field of Classification Search
CPC ........... G06Q 30/0631; G06Q 30/0633; G06Q 30/0643; G06Q 50/163; G06F 3/0486
See application file for complete search history.

(56) References Cited

U.S. PATENT DOCUMENTS

2016/0300392 A1    10/2016  Jonczyk et al.
2019/0164340 A1*   5/2019   Pejic ................. G06K 9/00476

* cited by examiner

SPATIAL REPRESENTATION IN VIRTUAL AND MIXED REALITY

FIELD OF INVENTION

The present disclosure generally relates to representation of space in a virtual reality environment. More particularly, the present disclosure relates to a system and method for spatial representation of functional spaces in a virtual reality environment.

BACKGROUND OF THE INVENTION

Virtual reality and mixed reality are widely used as means for experiencing three-dimensional content. Virtual reality is used in various applications such as gaming, healthcare, defence etc. for simulation of real environment surrounding a user as well as for immersive, interactive experience generated by the computer.

Creating a functional space such as office, home etc. involves several steps including but not limited to creating an interior design, finalizing the design of the interior and exterior spaces, procuring the required materials such as paints, furniture, electrical equipment, electronics etc. and ensuring the implementation of sourced raw materials as per the chosen design. Existing methods help in partially creating the functional spaces virtually either in two or three dimensions, which are then used by the end user to bring the functional space to reality.

While interior designing allows the user to experience the spatial volume in a two dimensional or three dimensional representation, often it may not result in the same environment being shaped in reality. Moreover, there is a tendency for the user to modify the design based on requirements, during the entire process. In addition, using the current methods, the user has to reach out to plurality of vendors/suppliers in order to meet the desired output as generated by the interior designer.

Therefore, there exists a need for improving the experience of the user engaged in creating functional spaces while overcoming the disadvantages of the existing methods.

BRIEF SUMMARY OF THE INVENTION

Before the present systems and methods, the embodiments are described, it is to be understood that this description is not limited to the particular systems, and methodologies described below, as there can be multiple possible embodiments of the present description and which are not expressly illustrated in the present disclosures. It is also to be understood that the terminology used in the description is for the purpose of describing the particular versions or embodiments only, and is not intended to limit the scope of the present description.

An example of a method for rendering a virtual or mixed reality based spatial representation of functional spaces is disclosed. The method comprises receiving, by a processor, an input associated with a floor plan of the functional space from a user. The method further comprises generating, by the processor, a spatial representation in three-dimensional format from the floor plan. The method further comprises recommending, by the processor, one or more products to the user based on the spatial representation generated. The method further comprises receiving, by the processor, confirmation from the user for initiating payment for purchasing the one or more products recommended. The method further comprises facilitating, by the processor, a communication between one or more sellers of the products and the user upon successful payment from the user.

An example of a system for rendering a virtual or mixed reality based spatial representation of functional spaces is disclosed. The system comprises a memory and a processor coupled to the memory, for executing program instructions stored in the memory for receiving an input associated with a floor plan of the functional space from a user. The processor further executes instructions stored in the memory for generating a spatial representation in three-dimensional format from the floor plan. The processor further executes instructions stored in the memory for recommending one or more products to the user based on the spatial representation generated. The processor further executes instructions stored in the memory for receiving confirmation from the user for initiating payment for purchasing the one or more products recommended. The processor further executes instructions stored in the memory for facilitating a communication between one or more sellers of the products and the user upon successful payment from the user.

To further clarify advantages and features of the present disclosure, a more particular description of the disclosure will be rendered by reference to specific embodiments thereof, which is illustrated in the appended figures. It is to be appreciated that these figures depict only typical embodiments of the disclosure and are therefore not to be considered limiting of its scope. The disclosure will be described and explained with additional specificity and detail with the accompanying figures.

BRIEF DESCRIPTION OF THE DRAWINGS

The foregoing summary, as well as the following detailed description of preferred embodiments, are better understood when read in conjunction with the appended drawings. For the purpose of illustration exemplary constructions of the description are shown in the drawings; however, the description is not limited to the specific methods and system disclosed.

Further, persons skilled in the art to which this disclosure belongs will appreciate that elements in the figures are illustrated for simplicity and may not have been necessarily been drawn to scale. Furthermore, in terms of the construction of the system, one or more components of the system may have been represented in the figures by conventional symbols, and the figures may show only those specific details that are pertinent to understanding the embodiments of the present disclosure so as not to obscure the figures with details that will be readily apparent to those of ordinary skill in the art having benefit of the description herein.

DETAILED DESCRIPTION

Some embodiments of this invention, illustrating its core functional features, will now be described below:

The words "comprising", "having", "containing", and "including", and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a", "an", and "the" include plural references unless the context clearly dictates otherwise. Although any systems, methods, apparatuses, and devices similar or equivalent to those described herein can be used in the practice or testing of embodiments of the present description, the preferred, systems and parts are now described. In the following description for the purpose of explanation and understanding reference has been made to numerous embodiments for which the intent is not to limit the scope of the description.

The disclosed embodiments are merely exemplary of the description, which may be embodied in various forms.

The present disclosure relates to a system and method for representing functional spaces in a virtual or mixed reality environment and more particularly to a system and method for adding and showcasing products inside the spatial representation of functional spaces. In one embodiment of the present disclosure, the spatial representation may be stored on a server or a local media. In one embodiment, a user obtains the spatial representation by uploading a floor plan of the functional space such as a home or office, creating a floor plan by using a drawing tool, or by selecting a preexisting floor plan. Retail outlet and ecommerce websites showcase their products inside the spatial representation, once accessed by a user. The retail outlet saves the user specific options at any time and place. Products displayed in e-commerce catalogues can also be viewed on the virtual reality spatial representation using web plugins and the like. The virtual reality spatial representation gets automatically synced, and the products inside at their exact respective location, are viewed by a virtual reality device. The method of the present disclosure comprises obtaining a spatial representation of the functional space, showcasing products inside the spatial representation, by a retail outlet, saving user specific options, viewing and sending products to the spatial representation by using ecommerce websites, and viewing the products inside the spatial representation on a virtual reality device.

Embodiments of the present disclosure will be described below in detail with reference to the accompanying figures.

Figure 1:
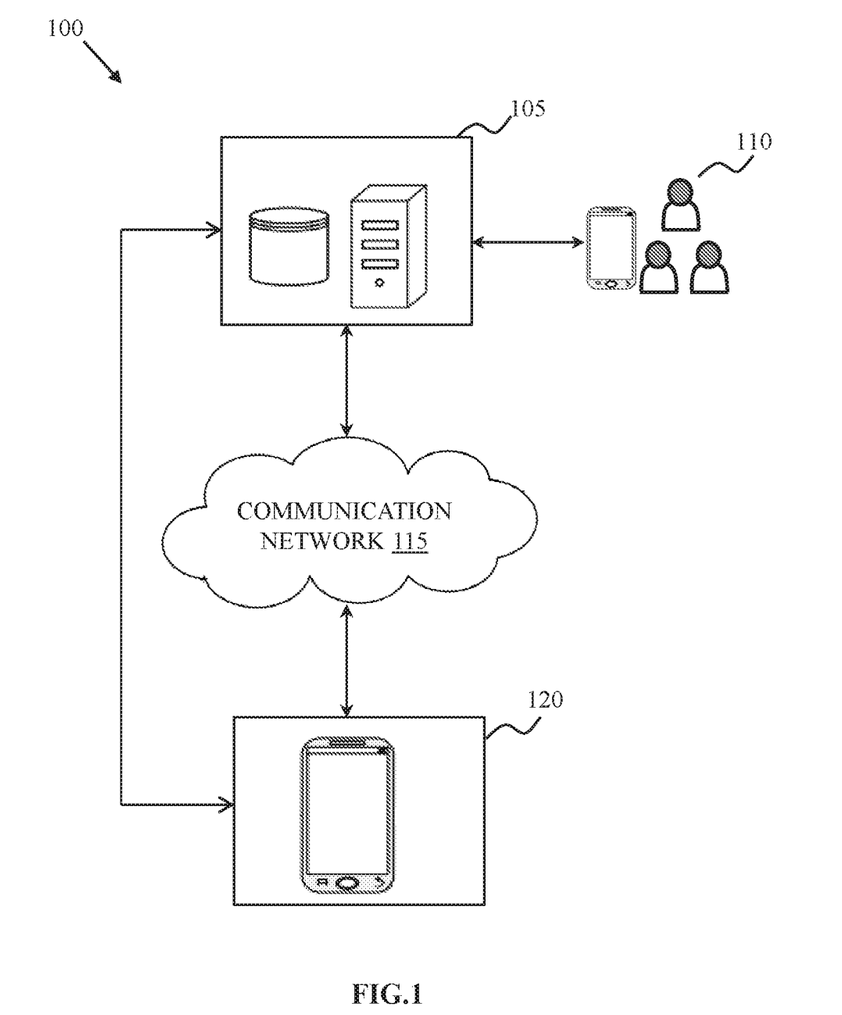
FIG. 1 illustrates an example representation of a system for adding and showcasing of products with an embodiment of the present disclosure.

FIG. 1 illustrates an example representation of a system 100 for spatial representation of a functional space and method of using the same. As shown, the system 100 comprises a remote server 105 coupled with a database, a communication network 115, and one or more electronic devices 110 and 120 associated with a plurality of users and configured to render and interact with virtual reality or mixed reality content.

In one embodiment of the present disclosure, a user obtains the three dimensional spatial representation of the functional space such as a house, office etc. by uploading a floor plan of the functional space or by creating a two dimensional floor plan of the functional space using drawing tools made available on the user interface. In one embodiment, the user may also select a pre-existing floor plan displayed on the user interface. Upon receiving the floor plan from the user, a 3D model generation module (described later) implemented on a remote server 105 generates the spatial representation of the functional space. In a preferred embodiment, the spatial representation thus generated may be downloaded and stored by the user on one or more electronic devices.

In one implementation, the remote server 105 comprises one or more processors, associated processing modules, interfaces, and storage devices communicatively interconnected to one another through one or more communication means for communicating information. The storage devices within the remote server 105 may include volatile and non-volatile memory devices for storing information and instructions to be executed by the one or more processors and for storing temporary variables or other intermediate information during processing.

In one implementation, the communication network 115 may be a wireless network or a wired network or a combination thereof. Wireless networks may include long range wireless radio, wireless personal area network (WPAN), wireless local area network (WLAN), mobile data communication such as 3G, 4G or any other similar technologies. The communication network 115 may be implemented as one of the different types of networks, such as intranet, local area network (LAN), wide area network (WAN), the internet, and the like. The communication network 115 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like. Further the communication network 115 may include a variety of network devices, including routers, bridges, servers, modems, computing devices, storage devices, and the like. In one implementation, the communication network 115 is the internet which enables communication between the remote server 105 and the one or more electronic devices 110, 120.

The one or more electronic devices 110, 120 may include one of a smartphone, a laptop, a notebook computer, a personal data assistant (PDA) and the like, capable of rendering and interacting with at least a virtual reality content and/or mixed reality content and having other communication capabilities. The electronic device 120 may communicate with the remote server 105 through the communication network 115 in one or more ways such as wired, wireless connections or a combination thereof. In one embodiment, the electronic devices 110 and 120 may include a combination of virtual reality rendering devices (such as headgear) and wearable gesturing devices for interacting with the content displayed on the electronic devices 110 and 120.

Figure 2:
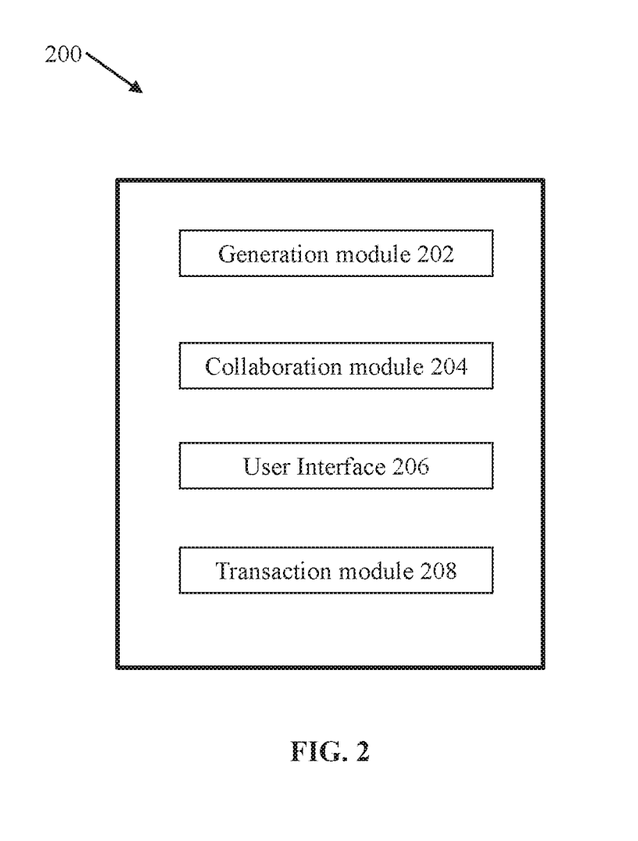
FIG. 2 illustrates a sectional view of a home floor plan with an embodiment of the present disclosure.

Now referring to FIG. 2, the system for spatial representation in accordance with embodiments of the present disclosure is described in more details. The remote server 105 coupled with the database serves as a platform for using the system of the present disclosure for generating, viewing and interacting with three dimensional spatial representation of functional spaces. The remote server 105 comprises of a generator module 202. The generator module 202 receives the floor plan of the functional spaces (usually in two dimensional format) in any of the known file formats and converts the same into a three dimensional spatial representation of the floor plan. The three-dimensional spatial representation thus generated is stored in the database and made available to the user of the electronic device 110, 120 for download, storing and viewing. Further, the three dimensional spatial representation of the functional space may be downloaded in a specific file format and retrieved using any of the known VR/AR content rendering tools.

Next, the remote server 200 further comprises a collaboration module 204 in accordance with embodiments of the present disclosure. The collaboration module 204 allows the user of the electronic device 110, 120 to share the spatial representation and engage with a plurality of other users, for example, interior designers, architects and the like. The collaboration module 204 further facilitates the one or more users to drag-and-drop a plurality of virtual objects depicting the products such as furniture, lights, electronic goods for example TV, Refrigerator etc. into the spatial representation. In one embodiment, the virtual objects may be displayed as overlays on the spatial representation by the one or more users using proprietary tools of the collaboration module 204. In addition, the one or more users such as interior designers, architects, sellers, e-sellers may add one or more artifacts (i.e. virtual objects) into the spatial representation using plugins or widgets provided on the plurality of browsing sites such as e-commerce websites, social networks and the like.

In one embodiment, the collaboration module 204 may further implement one or more algorithms for recommending one or more virtual objects to be placed in the spatial representation based on at least a spatial computation, context matching, a budget, a purchase history, a browsing history of the user and the like. The spatial computation as described herein refers to determination of space availability in a 3D/2D functional space. For example, if a virtual model of a living room of 10 ft*12 ft has room available for only 1 ft*1 ft bedside table, then the collaboration module 204 would recommend only those bedside tables fitting these dimensions. In addition, the collaboration module 204 allows the one or more users to share the spatial representation with one or more other users (outside the platform) such as interior designers, consultants etc. to seek their feedback.

The user interface 206 is configured to render the virtual reality content to the user of the electronic device 110, 120 as well as to other users using the collaboration module 204. The user interface 206 receives the commands from the users in the form of gestures, voice commands and the like and communicates the same to the processor of the remote server 200. The user interface 206 may further enable the one or more users to interact via a chat window and the like.

Further, the remote server 200 comprises a transaction module 208 in accordance with embodiments of the present disclosure. The transaction module 208 is configured to at least monitor the availability, capacity and the costs associated with the one or more virtual objects (i.e., products) embedded into the spatial representation. Upon receiving an indication of completion of collaboration on the spatial representation by the user of the electronic device 110, 120, the transaction module 208 displays the total cost for carrying out the designing of the functional spaces as per the plan generated using spatial representation and further facilitates payment using known methods and assigning the task to one or more selected sellers.

Figure 3:
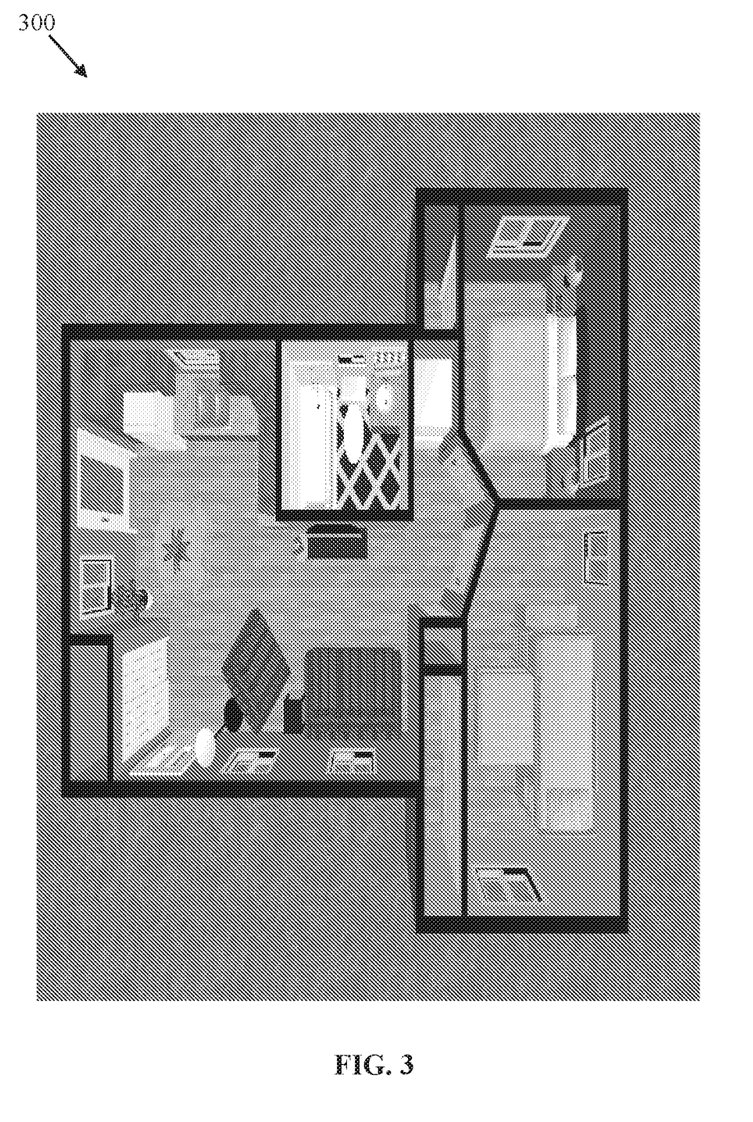
FIG. 3 shows a method of adding and showcasing products inside the virtual home with an embodiment of the present disclosure.

FIG. 3 illustrates a sectional view 300 of a home floor plan in accordance with embodiments of the present disclosure. As shown, the sectional view 300 comprises a sample floor plan of a home showing a particular living room generated by the remote server 105. Virtual objects like furniture, light, and a mat are also shown in the sectional view. These virtual objects can be added into the spatial representation from any of the sellers and may be purchased by the user of the electronic device 110. In one embodiment, the sectional view 300, viewable using virtual reality enabled electronic device 110 may also comprise an additional window displaying recommended products to be added into the spatial representation.

In another embodiment, the spatial representation generated using system and methods of the present disclosure may be used by the user of the electronic device 110, 120 in a home automation system. For example, the user of the electronic device 110 may use the spatial representation to control the one or more devices such as lights, air conditioners etc. after integrating the spatial representation with the home automation system.

In yet another embodiment of the present disclosure, the spatial representation 105 constantly saves changes in virtual product purchases from retails outlets and ecommerce websites. Along with this, the purchase history of the one or more users 110 is circulated to the retail outlets. The person monitoring the purchases in the retail outlet may give his/her feedback to the one or more users 110. For example, whether the virtual product purchased is good, whether it will suit the look and design of the functional space, any similar products like the one purchased, or any sales, offers, and discounts. This builds a communication relationship between the one or more users 110 and the retail outlet monitor person.

It is to be noted that the system and methods of the present disclosure are applicable to plurality of physical spaces including but not limited to office spaces, public establishments, malls, transportation means and the like.

The spatial representation 105 of the present disclosure is configured to operate at two levels: on one hand the one or more users 110 may upload the floor plans, images and the like pertaining to the physical landscape that the users wish to modify or upgrade using the plurality of applications offered by the platform of the present disclosure. On the other end, the spatial representation 105 thus prepared by the one or more users 110 is shareable via the platform of the present disclosure with one or more suppliers such as e-commerce merchants, retail outlets and the like. In one embodiment, the one or more users 110 browsing on the e-commerce websites and/or in the real world retail outlets may obtain the spatial representation 105 using a mobile application, a web application, a widget, a URL and the like. Furthermore, the retailers (i.e. retail outlets) and the e-commerce websites may be configured to integrate the software suite offered by the platform of the present disclosure to perform plurality of actions on the spatial representation 105.

In one embodiment of the present disclosure, the spatial representation 105 of a functional space such as home, office etc. is configured to be rendered in a real environment such that the contents of the spatial representation 105 appear in augmented reality when rendered using a VR/AR device in a real environment. In addition, the contents of the spatial representation 105 may be synced to the user's viewing angle (yaw, pitch) as well as the dimensions of the real environment upon receiving instructions from the user. For example, a spatial representation 105 of a 2BHK home prepared using the system and methods of the present disclosure may be viewed by the user at the actual site of the said 2BHK home such that the contents of the home, for example, furniture, home appliances etc. included in the spatial representation 105 are now rendered in augmented reality after syncing the contents to the line of sight and dimensions of the real environment at the current position of the user upon receiving one or more gestures, clicks from the user wearing an Augmented Reality (AR)/Virtual Reality (VR) device. Further, the user may interact with the rendered content and make selection for the final purchase of the contents rendered with preferably a gesture, a click or any other modes of interaction known in the art.

Figure 4:
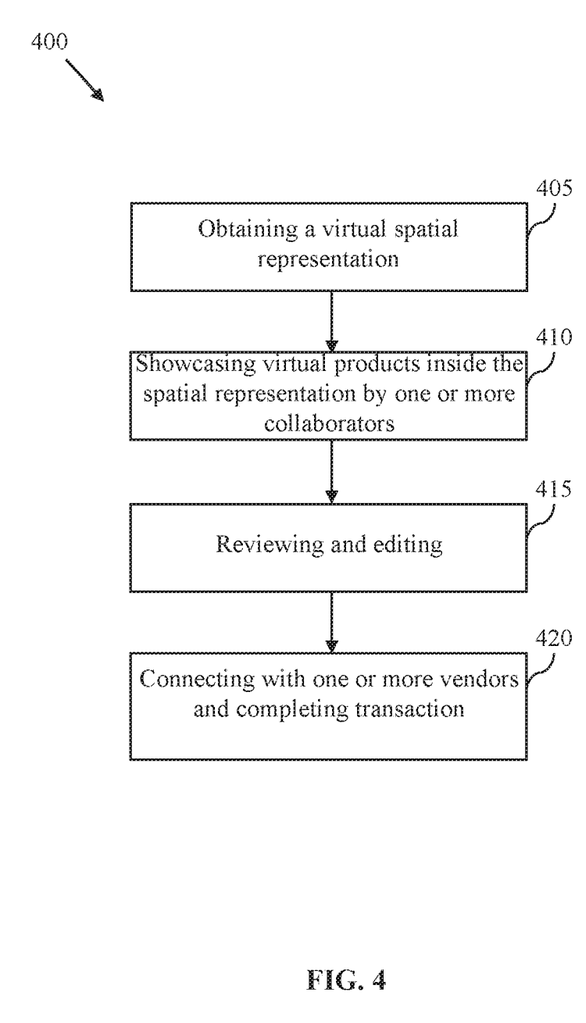
FIG. 4 is a flow diagram that illustrates a method for using a spatial representation of functional spaces.

Now referring to FIG. 4, a method 400 for using the spatial representation of functional spaces is shown. The method 400 may be described in the general context of computer executable instructions. Generally, computer executable instructions may include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described and is not intended to be construed as a limitation, and any number of the described method blocks can be combined in any order to implement the method 400 or alternate methods. Additionally, individual blocks may be deleted from the method 400 without departing from the spirit and scope of the disclosure described herein. Furthermore, the method may be implemented in any suitable hardware, software, firmware, or combination thereof. However, for ease of explanation, in the embodiments described below, the method 400 may be implemented in the above-described system 100.

The method 400 starts at step 405 with generation of spatial representation using the generator module of the system 100. The spatial representation is a three dimensional interactive representation of the floor plan input by the user of the electronic device 110. The spatial representation thus generated may be downloaded, stored and shared by the user of the electronic device 120. At step 410, one or more users and/or collaborators (such as sellers, interior designers, architects etc.) accessing the platform of the present disclosure may add a plurality of virtual objects as per the requirements of the user of the electronic device 120. In one embodiment, the user may drag-and-drop the virtual objects of interest from one or more e-commerce websites.

At step 415, the user of the electronic device reviews the model of the functional space thus generated after collaborating on the spatial representation. At this step, the user may share the spatial representation with one or more other users to get feedback and the like. Upon receiving a confirmation from the user, at step 420, the transaction module 208 initiates payment for the plurality of virtual objects displayed in the spatial representation and upon successful payment, facilitates a communication between the one or more sellers of the products corresponding to the virtual objects. Consequently, the system 100 enables the user to execute the design based on the spatial representation created.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. The scope of embodiments is at least as broad as given by the following claims.

The written description describes the subject matter herein to enable any person skilled in the art to make and use the embodiments of the invention. The scope of the subject matter embodiments are defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

I claim:

1. A method for rendering a virtual or mixed reality based spatial representation of a functional space, the method comprising:
    receiving, by a processor of a server, an input associated with a floor plan of the functional space from an electronic device of a plurality of electronic devices associated with a plurality of respective users;
    generating, by the processor of the server, a spatial representation in a three-dimensional format from the input associated with the floor plan;
    recommending, by the processor of the server, one or more products of the functional space based on the spatial representation generated; and
    sharing, by the processor of the server, the generated spatial representation with the plurality of electronic devices for collaborating with the plurality of respective users by enabling the plurality of respective users to drag and drop one or more virtual objects representative of the recommended one or more products, one or more other artifacts, or a combination thereof using plugins or widgets, wherein the one or more virtual objects are displayed as overlays on the spatial representation.

2. The method as claimed in claim 1, further comprising:
    monitoring, by the processor of the server, an availability, a capacity, and costs associated with the one or more virtual objects displayed as the overlays on the spatial representation during the collaboration with the plurality of respective users, wherein the plurality of respective users comprises one or more designers, one or more architects, and one or more sellers;
    displaying, by the server, a total cost for designing the functional space based on the monitoring of the availability, the capacity, and the costs associated with the one or more virtual objects displayed as the overlays on the spatial representation; and
    facilitating, by the processor of the server, a payment of the total cost and assigning tasks to the one or more sellers.

3. The method as claimed in claim 1, wherein the one or more products are recommended based on at least one of a spatial computation, a context matching, a budget, a purchase history, and a browsing history of a user of the electronic device among the plurality of electronic devices.

4. The method as claimed in claim 1, wherein the one or more products are displayed as the one or more virtual objects overlaid on the spatial representation during recommendation.

5. The method as claimed in claim 1, further comprising rendering in augmented reality, by the server, the spatial representation in a real environment of the functional space, wherein the one or more virtual objects overlaid on the spatial representation is synced based on a user's viewing angle representative of a yaw and a pitch, and dimensions of the real environment of the functional space.

6. A system for rendering a virtual or mixed reality based spatial representation of a functional space, the system comprising:
a server comprising:
a memory; and
a processor coupled to the memory, for executing program instructions stored in the memory for:
receiving an input associated with a floor plan of the functional space from an electronic device of a plurality of electronic devices associated with a plurality of respective users;
generating a spatial representation in a three-dimensional format from the input associated with the floor plan;
recommending one or more products of the functional space based on the spatial representation generated; and
sharing the generated spatial representation with the plurality of electronic devices for collaborating with the plurality of respective users by enabling the plurality of respective users to drag and drop one or more virtual objects representative of the recommended one or more products, one or more other artifacts, or a combination thereof using plugins or widgets, wherein the one or more virtual objects are displayed as overlays on the spatial representation.

7. The system as claimed in claim 6, wherein the processor further executes instructions stored in the memory for:
monitoring an availability, a capacity, and costs associated with the one or more virtual objects displayed as the overlays on the spatial representation during the collaboration with the plurality of respective users, wherein the plurality of respective users comprises one or more designers, one or more architects, and one or more sellers;
displaying a total cost for designing the functional space based on the monitoring of the availability, the capacity, and the costs associated with the one or more virtual objects displayed as the overlays on the spatial representation; and
facilitating a payment of the total cost and assigning tasks to the one or more sellers.

8. The system as claimed in claim 6, wherein the one or more products are recommended based on at least one of a spatial computation, a context matching, a budget, a purchase history, and a browsing history of a user of the electronic device among the plurality of electronic devices.

9. The system as claimed in claim 6, wherein the one or more products are displayed as the one or more virtual objects overlaid on the spatial representation during recommendation.

10. The system as claimed in claim 6, wherein the processor further executes instructions stored in the memory for rendering in augmented reality, the spatial representation in a real environment of the functional space, wherein the one or more virtual objects overlaid on the spatial representation is synced based on a user's viewing angle representative of a yaw and a pitch, and dimensions of the real environment of the functional space.

\* \* \* \* \*